(12) United States Patent
Fulton et al.

(10) Patent No.: US 8,931,184 B1
(45) Date of Patent: Jan. 13, 2015

(54) METHOD FOR DIMENSIONALLY INSPECTING A COMPONENT OF A GAS TURBINE SYSTEM

(75) Inventors: Blake Allen Fulton, Simpsonville, SC (US); James Carroll Baummer, Atlanta, GA (US); Mark Carmine Bellino, Greenville, SC (US); Matthew Paul Berkebile, Mauldin, SC (US); Charles Van Buchan, Greer, SC (US); Eunice Delia Reyes, Weslaco, TX (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 13/476,253

(22) Filed: May 21, 2012

(51) Int. Cl.
*G01B 5/008* (2006.01)
*G01B 5/20* (2006.01)

(52) U.S. Cl.
USPC .......................................... 33/554; 33/1 BB

(58) Field of Classification Search
USPC ......... 33/553, 1 BB, 503, 549, 551, 554, 555, 33/568, 573
See application file for complete search history.

(56) References Cited

U.S. PATENT DOCUMENTS

| | | | |
|---|---|---|---|
| 4,222,172 A | | 9/1980 | Mason |
| 5,107,599 A | * | 4/1992 | Marincic et al. ................ 33/573 |
| 5,408,754 A | * | 4/1995 | Raab ............................... 33/503 |
| 5,412,877 A | * | 5/1995 | McKendrick ................... 33/567 |
| 5,625,959 A | * | 5/1997 | Ercole et al. .................... 33/568 |
| 5,829,151 A | * | 11/1998 | Collier et al. ................... 33/573 |
| 6,145,212 A | * | 11/2000 | Geise et al. ..................... 33/549 |
| 6,298,572 B1 | * | 10/2001 | McAuley ........................ 33/573 |
| 6,525,500 B2 | | 2/2003 | Hatley et al. |
| 6,532,840 B2 | | 3/2003 | Hatley et al. |
| 6,598,306 B2 | * | 7/2003 | Eaton .............................. 33/503 |
| 6,817,108 B2 | * | 11/2004 | Eaton .............................. 33/503 |
| 6,842,995 B2 | * | 1/2005 | Jones et al. ..................... 33/645 |
| 6,957,496 B2 | * | 10/2005 | Raab et al. ...................... 33/503 |
| 7,017,431 B2 | | 3/2006 | King et al. |
| 7,178,255 B1 | * | 2/2007 | Roesel et al. ................... 33/645 |
| 7,310,889 B2 | * | 12/2007 | Stamenkovic .................. 33/503 |
| 7,662,091 B2 | | 2/2010 | Bagley et al. |
| 7,840,367 B2 | | 11/2010 | Little et al. |
| 7,918,433 B2 | | 4/2011 | Melton et al. |
| 7,921,575 B2 | * | 4/2011 | Little et al. ...................... 33/503 |
| 8,229,208 B2 | * | 7/2012 | Pulla et al. .................... 382/154 |
| 8,453,337 B2 | * | 6/2013 | Lacy ............................... 33/503 |
| 2010/0030514 A1 | | 2/2010 | Lange et al. |
| 2010/0046008 A1 | | 2/2010 | Ghulam |

FOREIGN PATENT DOCUMENTS

WO        WO2008124915 A1        10/2008

\* cited by examiner

*Primary Examiner* — Christopher Fulton
(74) *Attorney, Agent, or Firm* — Cantor Colburn LLP

(57) ABSTRACT

A method for dimensionally inspecting a component of a gas turbine system is provided. The method includes disposing the component on a fixture for stabilizing the component. Also included is probing a first datum location of the component with a coordinate measurement machine for establishing a first datum point. Further included is probing at least one location of the component with the coordinate measurement machine to determine at least one measurement relative to the first datum point. Yet further included is displaying the at least one measurement in an output report.

12 Claims, 4 Drawing Sheets

METHOD FOR DIMENSIONALLY INSPECTING A COMPONENT OF A GAS TURBINE SYSTEM

BACKGROUND OF THE INVENTION

The subject matter disclosed herein relates to gas turbine systems, and more particularly to a method for dimensionally inspecting a component of such gas turbine systems.

Gas turbine system components undergo a dimensional analysis prior to assembly with other gas turbine system components to ensure that the dimensions of the component are within an acceptable tolerance range. Dimensions falling within the acceptable tolerance range allow the component to assemble within the overall gas turbine system properly and operate as intended. Conversely, deviation from the acceptable tolerance range prevents or inhibits assembly and/or intended operation. The dimensional analysis of the component, such as a transition piece, for example, may include various techniques, including employing a hard-gage tool and often require the dimensional analysis to be conducted in a specific location.

BRIEF DESCRIPTION OF THE INVENTION

According to one aspect of the invention, a method for dimensionally inspecting a component of a gas turbine system is provided. The method includes disposing the component on a fixture for stabilizing the component. Also included is probing a first datum location of the component with a coordinate measurement machine for establishing a first datum point. Further included is probing at least one location of the component with the coordinate measurement machine to determine at least one measurement relative to the first datum point. Yet further included is displaying the at least one measurement in an output report.

According to another aspect of the invention, a method of dimensionally inspecting a component of a gas turbine system is provided. The method includes disposing the component on a fixture for stabilizing the component. Also included is probing a plurality of locations of a surface of the component with a portable coordinate measurement machine in response to a series of prompts provided by a graphical user interface to a user, wherein probing the plurality of locations records at least one measurement. Further included is comparing the at least one measurement to a predetermined dimensional tolerance range.

According to yet another aspect of the invention, a method of recording dimensional data for a transition piece of a gas turbine system is provided. The method includes probing at least one datum location on a surface of the transition piece with a portable coordinate measurement machine. Also included is probing at least one location on the surface of the transition piece with the portable coordinate measurement machine for recording at least one measurement relative to the at least one datum location. Further included is comparing the at least one measurement to a predetermined dimensional tolerance range. Yet further included is displaying the at least one measurement in an output report.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
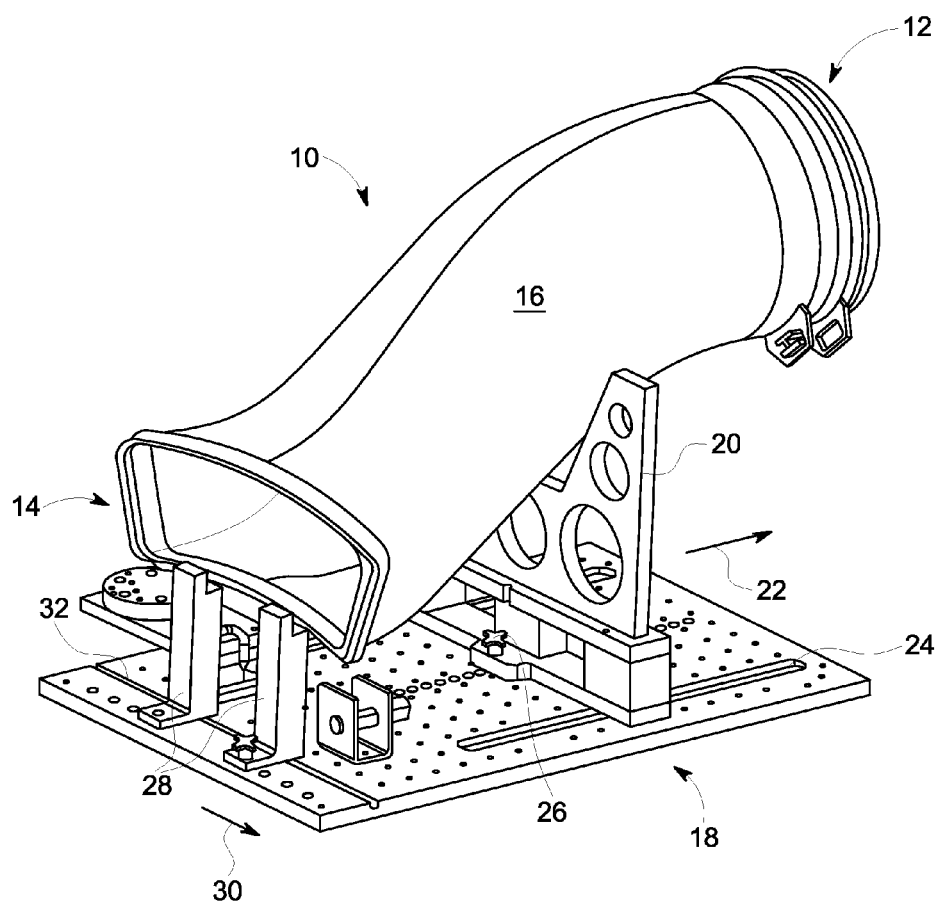
FIG. 1 is a perspective view of a component of a gas turbine system disposed on a fixture for stabilizing the component.
Figure 2:
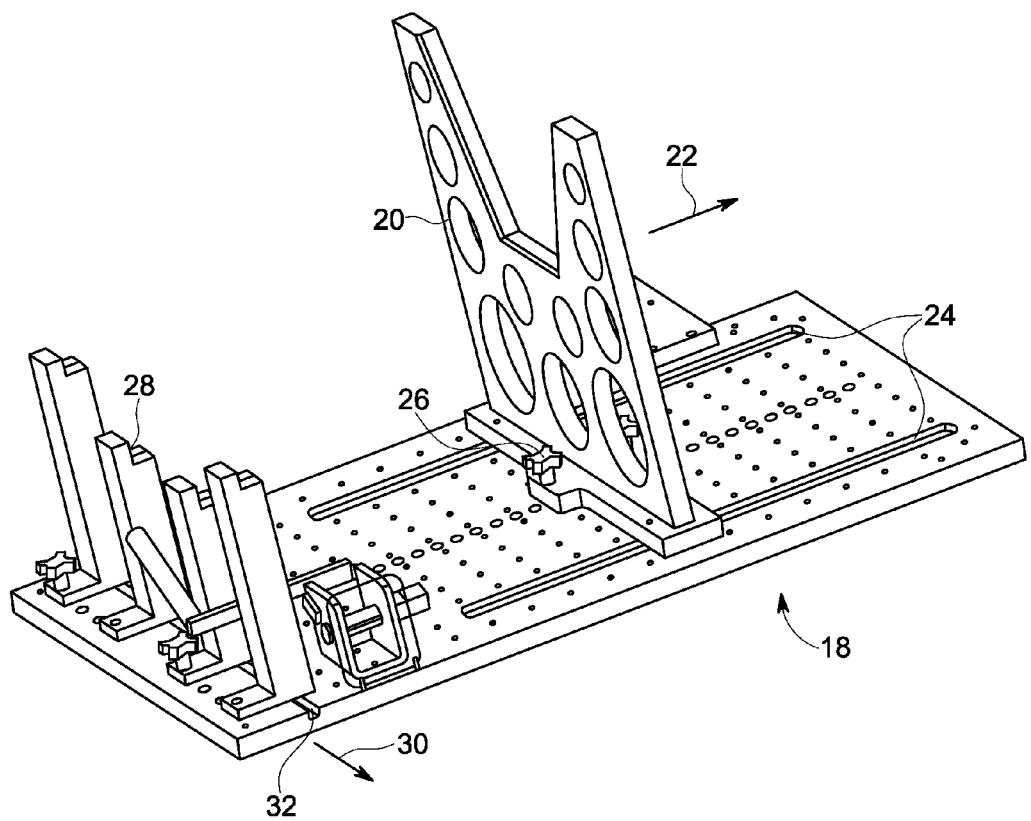
FIG. 2 is a perspective view of the fixture.

Referring to FIGS. 1 and 2, a transition piece of a gas turbine system is referred to generally with numeral 10. Although illustrated and described herein as the transition piece 10, it is to be appreciated that any component of the gas turbine system requiring measurement and dimensional analysis may be used in conjunction with the method(s) described below.

The transition piece 10 includes an inlet end 12 that is configured to be in operable communication with at least one, but typically a plurality of combustor cans (not illustrated) arranged in an annular array for supplying hot combustion gas to the transition piece. The transition piece 10 also includes an outlet end 14 that is configured for communication with an inlet of a turbine section (not illustrated) for transferring the hot combustion gas to the turbine section, where the hot combustion gas passes over a plurality of rotor blades, thereby driving a rotor shaft. The transition piece 10 may be of various geometric configurations and sizes, depending on the specific type of gas turbine system that the transition piece 10 is to be employed within. As noted above, the transition piece 10 is configured to be assembled in a manner that disposes the transition piece 10 to be in operable communication with the combustor cans and the turbine section, among other components within the gas turbine system. To facilitate proper assembly, the transition piece 10 includes a plurality of critical to quality (CTQ) dimensions that allow the transition piece 10 to be assembled in conjunction with various other components of the gas turbine system. The CTQ dimensions comprise various measurements between a plurality of locations on a surface 16 of the transition piece 10 and includes height, width, length and combinations thereof. The CTQ dimensions include predetermined dimensional tolerance ranges that account for manufacturing variations, while still allowing the transition piece 10 to assemble and operate properly.

In order to determine whether the CTQ dimensions of the transition piece 10 are within the predetermined dimensional tolerance ranges, a dimensional analysis of the transition piece 10 is conducted. During the dimensional analysis, the transition piece 10 is disposed on a fixture 18 configured to securely support and stabilize the transition piece 10. The fixture 18 is adjustable to adaptably support various transition pieces having distinct sizes and/or geometry. Specifically, the fixture 18 includes an upstream support 20 for supporting a region of the transition piece 10 proximate the inlet end 12. The upstream support 20 may displace, such as in a first direction 22, for example, along a first at least one guide 24 and is locked in place with a fastener 26. Additionally, the fixture 18 includes a downstream support 28 for supporting a region of the transition piece 10 proximate the outlet end 14.

The downstream support 28 may also displace, such as in a second direction 30, for example, along a second at least one guide 32. The fixture 18 may also include a fastener belt (not illustrated) to further ensure stabilization of the transition piece 10.

Figure 3:
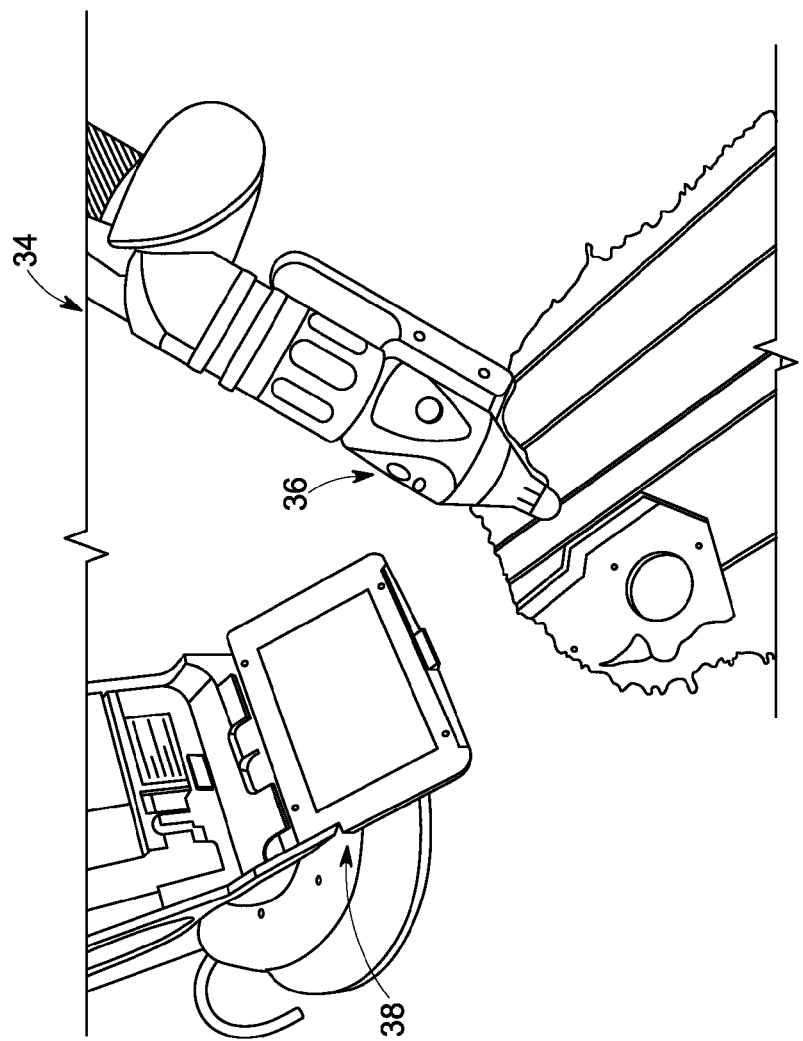
FIG. 3 is a perspective view of a coordinate measurement machine.

Referring now to FIG. 3, a coordinate measurement machine (CMM) 34 is employed to perform the dimensional analysis to determine if the CTQ dimensions are within the predetermined dimensional tolerance ranges. The coordinate measurement machine (CMM) 34 is portable, such that it is conveniently transportable to various locations where the transition piece 10 may be situated. Such portability allows the dimensional analysis to be conducted prior to shipment or at an on-site location, for example. The coordinate measurement machine (CMM) 34 includes a probe 36 for engaging a plurality of locations on the surface 16 of the transition piece 10, thereby inputting the coordinates of the plurality of locations into the coordinate measurement machine (CMM) 34 for processing therein. A graphical user interface (GUI) 38 is included and provides a user graphical images and/or text to instruct and prompt the user to perform various tasks, including engagement of precise locations of the surface 16 with the probe 36. The CMM 34 may be of various configurations, with exemplary CMMs 34 available from FARO®, such as a FARO Edge™ and a FARO Platinum™. It is to be appreciated that any CMM 34 having sufficient length to reach all locations of the transition piece 10 may be suitable.

Figure 4:
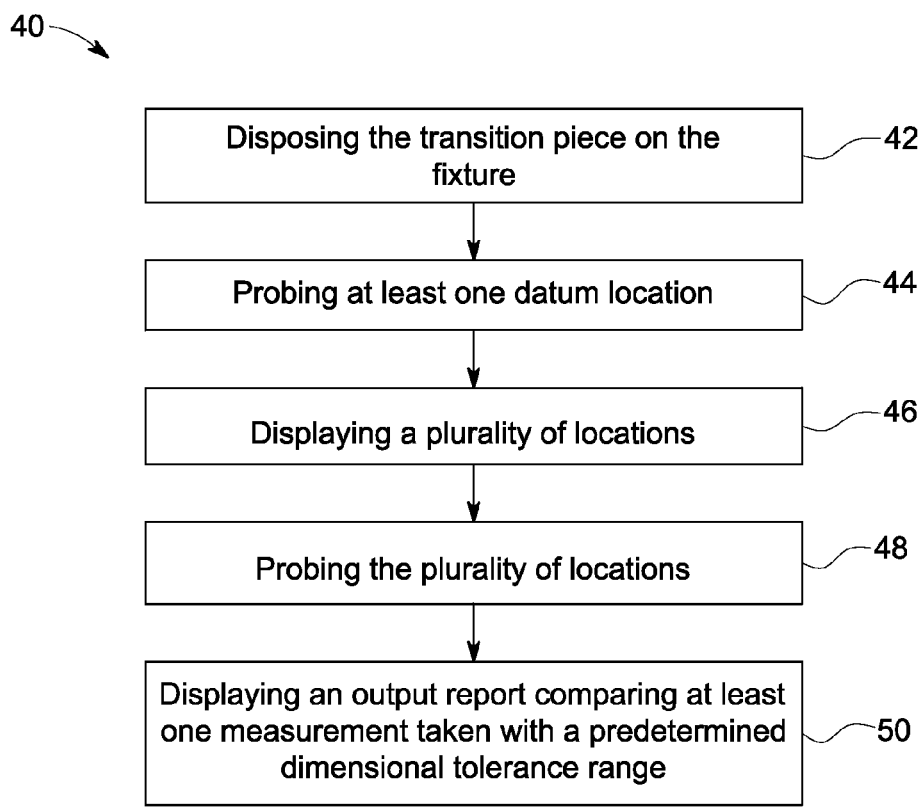
FIG. 4 is a flow diagram illustrating a method of dimensionally inspecting the component.

Referring now to FIG. 4, a flow diagram illustrates a method for dimensionally inspecting 40 the transition piece 10. The transition piece 10, the fixture 18 and the CMM 34 have been previously described, such that specific components need not be described in further detail. The method of dimensionally inspecting 40 includes disposing the transition piece on the fixture 42, thereby stabilizing the transition piece 10. To establish a reference from which one or more measurements may be performed, the user probes at least one datum location 44 to establish at least one datum point. The GUI 38 of the CMM 34 displays a plurality of locations 46 to be probed with the probe 36, with the plurality of locations comprising the at least one datum point, as well as additional locations on the surface 16 of the transition piece 10 to be probed. The plurality of locations displayed by the GUI 38 is programmable and reflects specific, identifiable locations that the user probes to measure various CTQ dimensions. The GUI 38 includes images and/or text instructing the user what specific locations on the surface 16 are to be probed. The at least one datum location may be located in various locations, such that the location is a convenient reference point from which a plurality of other locations may be measured relative to. Upon prompting from the GUI 38, the user probes the plurality of locations 48. After the user probes the plurality of locations 48, an output report is displayed 50 that summarizes a comparison of the measurements taken with the predetermined dimensional tolerance range. The output report displays the measurements taken and may be generated in the form of an image representing the plurality of locations probed and/or text numerical values that may be color-coded. A color-coded graphical image and/or text value represents whether the measurement taken is within the predetermined dimensional tolerance range. If outside the predetermined dimensional tolerance range, the color may further indicate whether the measurement is too large or small, thereby indicating not only a dimensional failure, but also what corrective action may need to be taken.

Accordingly, a user may portably measure the transition piece 10 and is prompted by the CMM 34 to precisely measure CTQ dimensions along various portions of the surface 16 of the transition piece 10. In addition to providing a user-friendly measurement taking process, the CMM 34 records and displays the actual measurements and compares the measurements to acceptable dimensional ranges.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for dimensionally inspecting a component of a gas turbine system comprising:
   disposing a transition piece on a fixture for stabilizing the transition piece;
   prompting a user with graphical images of a plurality of locations to be probed with a coordinate measurement machine, wherein prompting the user with graphical images of the plurality of locations includes images and text instructing a user where the plurality of locations are disposed;
   probing a first datum location of the component with the coordinate measurement machine for establishing a first datum point;
   probing at least one location of the component with the coordinate measurement machine to determine at least one measurement relative to the first datum point; and
   displaying the at least one measurement in an output report.

2. The method of claim 1, wherein the coordinate measurement machine is a portable assembly.

3. The method of claim 1, wherein the plurality of locations includes the first datum location and the at least one location of the component.

4. The method of claim 1, further comprising probing a second datum location for establishing a second datum point, wherein the plurality of locations are measured relative to the first datum point and the second datum point.

5. The method of claim 1, wherein displaying the at least one measurement in the output report comprises an image of the plurality of locations.

6. The method of claim 1, wherein displaying the at least one measurement in the output report comprises text numerical values, wherein the text numerical values are color-coded relative to predetermined tolerances.

7. A method of dimensionally inspecting a component of a gas turbine system comprising:
   disposing the component on a fixture for stabilizing the component;
   prompting a user with a series of graphical images of a plurality of locations to be probed with a coordinate measurement machine, wherein the series of graphical images comprises an image illustrating the plurality of locations of the surface of the component to be probed with the portable coordinate measurement machine;
   probing the plurality of locations of a surface of the component with the portable coordinate measurement machine, wherein probing the plurality of locations records at least one measurement; and
   comparing the at least one measurement to a predetermined dimensional tolerance range.

8. The method of claim 7, wherein the series of graphical images comprises text instructing the user.

9. The method of claim 7, wherein the plurality of locations comprises a first datum location, wherein the at least one measurement is relative to the first datum location.

10. The method of claim 7, further comprising displaying the at least one measurement in an output report.

11. The method of claim 10, wherein the output report comprises text numerical values, wherein the text numerical values are color-coded relative to the predetermined dimensional tolerance range.

12. The method of claim 7, wherein the component comprises a transition piece.

\* \* \* \* \*